F. J. PRITCHARD.
CULTIVATOR.
APPLICATION FILED JULY 15, 1915.

1,178,025.

Patented Apr. 4, 1916.
2 SHEETS—SHEET 1.

Inventor
Frederick J. Pritchard

By Henrie Goldsborough O'Neill
Attorneys

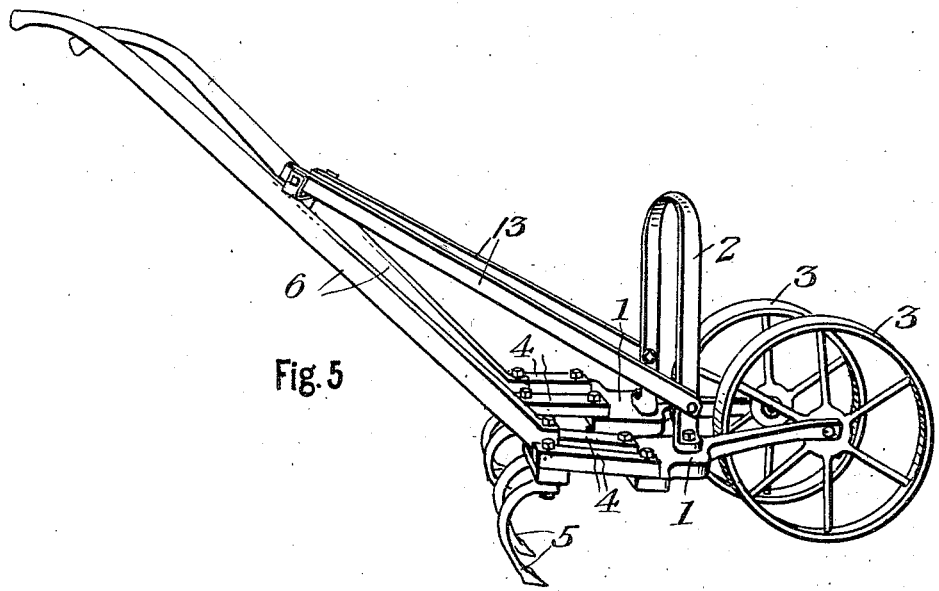
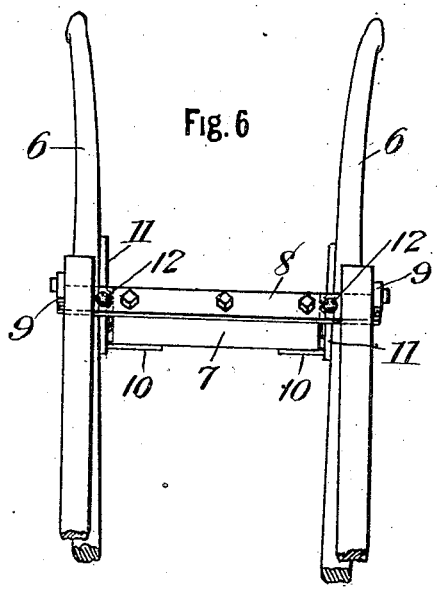
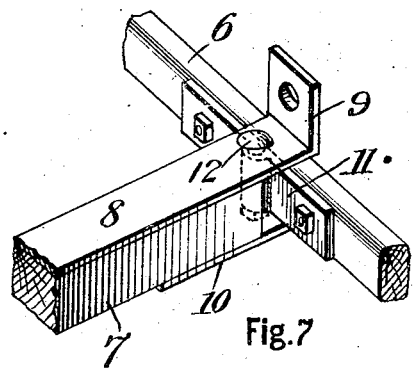

UNITED STATES PATENT OFFICE.

FREDERICK J. PRITCHARD, OF WASHINGTON, DISTRICT OF COLUMBIA.

CULTIVATOR.

1,178,025.         Specification of Letters Patent.         Patented Apr. 4, 1916.

Application filed July 15, 1915. Serial No. 40,070.

*To all whom it may concern:*

Be it known that I, FREDERICK J. PRITCHARD, a citizen of the United States, and resident of the city of Washington, District of Columbia, have invented certain new and useful Improvements in Cultivators; and I do hereby declare the following to be a full, clear, and exact description of the invention, such as will enable others skilled in the art to which it appertains to make and use the same.

The invention relates to cultivators, plows and the like, adapted to cultivate or break up the soil between adjacent plant rows and also between successive plants in the same row, and to this end, comprises a machine of the class described, involving a wheeled frame adapted to straddle a plant row and having connected to either side thereof, shovel or similar tool bearing members capable of being adjusted laterally with respect to said frame so as to move the shovels or tools toward or from each other so that they will engage the ground between adjacent plant rows, when the said shovel-bearing members are moved apart and will engage the ground between adjacent plants in the same row when the shovel-bearing members are moved inwardly toward each other, the movement of the shovel-bearing members being effected by hand levers, which may also constitute the handles of the cultivator, which hand levers are connected to the shovel-bearing members at their lower ends, and are fulcrumed to the frame at a point intermediate the lengths of said hand levers, the several parts being so coördinated that a relatively small movement of the hands of the operator will adjust the shovels quickly and accurately to effect the desired objects, to wit, to cultivate the ground between the rows, or between plants in the same row, without danger of injuring the valuable plants, and at the same time, admitting of the ground being thoroughly stirred up all about each individual plant and also permitting the complete removal of weeds and undesirable plants between the rows and between the plants of individual rows.

Figure 1:
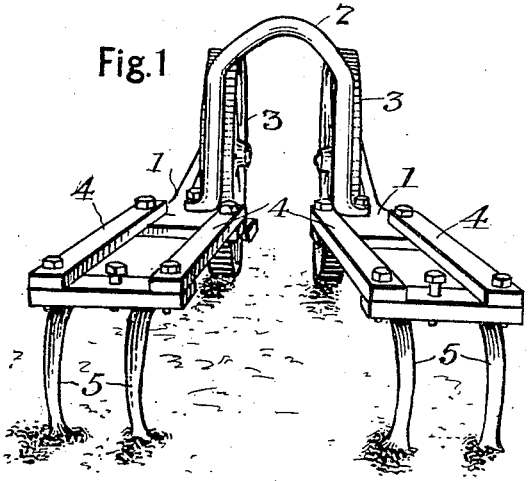
Figure 2:
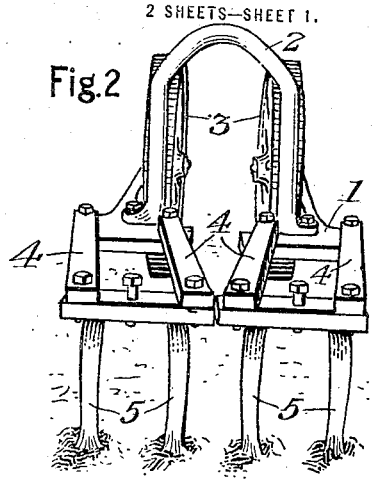
Figure 3:
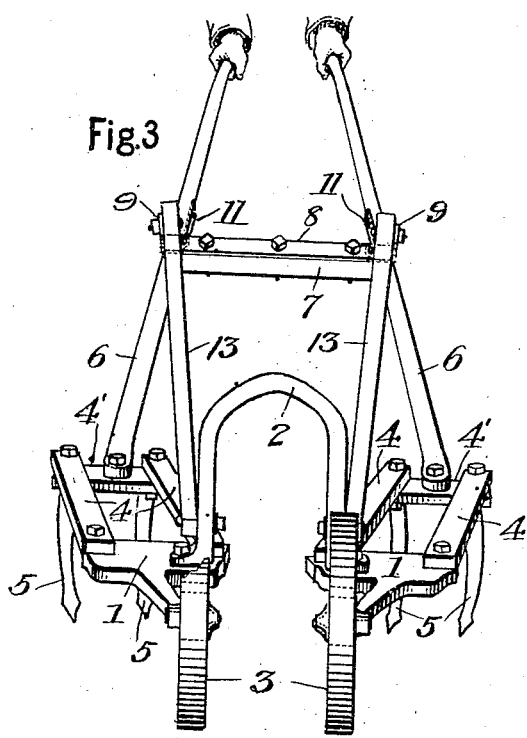
Figure 4:
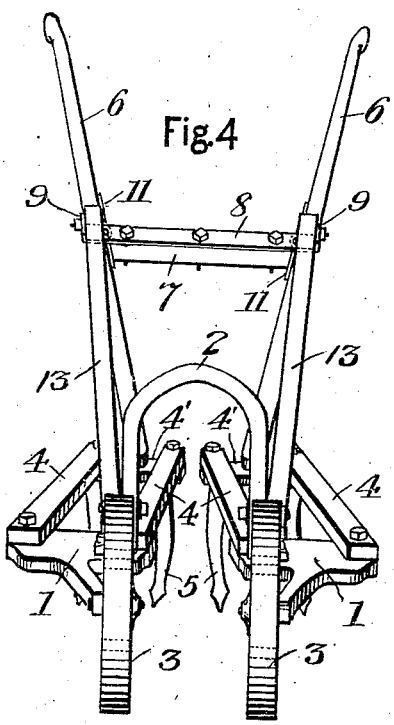

One form of the invention is illustrated in the accompanying drawings, in which, Figure 1 is perspective view of the cultivator, with the handles removed and with the shovel-bearing members spread apart to cultivate between rows. Fig. 2 is a corresponding view showing the shovel-bearing members brought together to cause the shovels to cultivate between adjacent plants in the same row. Fig. 3 is a front perspective showing the cultivator in spread relation. Fig. 4 is a corresponding view showing the shovels brought together. Fig. 5 is a side perspective view. Fig. 6 is an enlarged perspective showing the connection between the handles and their support. Fig. 7 is an enlarged perspective showing the means for connecting the handles to the cross bar.

Although the invention is shown as applied to a hand cultivator, it is to be understood that it is not limited to this particular type of machine, inasmuch as it is well adapted to horse or power-operated cultivators.

Referring to the drawings, 1 indicates two side frames having journaled at their outer ends two spaced wheels 3, said frames being rigidly connected by an arch bar 2, the parts being so arranged that a clear space is left between the wheels and under the arch bar, so that the machine may be operated with the side frames 1 lying on opposite sides of the plant rows and said arch bar straddling the plants of such rows.

Pivotally connected to the rear ends of each of the side frames 1 are shovel bearing members each comprising two parallel bars 4, 4 pivotally connected at their rear ends by a cross piece 4', said shovel-bearing members thus constituting what is in effect a parallel link-motion capable of lateral oscillation in a generally horizontal plane to swing the said shovel-bearing members toward and from each other.

Mounted on the rear end of each shovel-bearing member are shovels or similar tools 5, 5, two such tools being so applied to each bearing member, although it is obvious that any desired number of shovels or tools may be employed.

In order to afford a quick and accurate adjustment of the shovel-bearing members toward and from each other, in a horizontal plane, there are provided two operating levers 6. As shown, these levers constitute the handles for the machine, but their use for this purpose is not necessary. Each of the hand levers 6 is pivotally connected at its lower or forward end to the cross bar 4' of the corresponding shovel-bearing member. Intermediate the length of the hand levers 6, the latter are connected together by means of a cross bar 7, which constitute a fulcrum member for the hand levers. In order to provide a strong, simple, and durable connection between the cross bar 7 and the handles, the latter is provided with a strap piece 8 bolted to its top and extending laterally beyond the outer sides of the handles and having turned-up perforated ears or lugs 9. To the bottom of the cross bar 7 are secured two straps 10. On the inner side of each of the hand levers is bolted a strap 11 having an eye or socket adapted to be brought into registry with perforations in the straps 8 and 10 to pivotally connect the hand levers 6 with the cross bar 7, as clearly illustrated in Fig. 7.

Bolted at their lower ends to the U-frame 2 and at their upper ends to the ears 9 of the strap 8 are two reach rods or supports 13, which tie the fulcrum bar 7 to the frame of the machine and therefore support the hand levers in proper operative relation while permitting any necessary up and down movement of the hand levers and the shovel-bearing members.

As thus described, the apparatus constitutes a simple, durable and efficient device for effecting all of the ordinary operations of a cultivator, either hand or power-operated, and in addition thereto, affording a degree of flexibility which admits of the manipulation of the machine to thoroughly cultivate, not only the ground between the rows of plants, but between plants in a given row so that cultivation can be effected completely around each individual plant, without danger of injuring the plant. In operating the device as a hand cultivator, the machine is adjusted so that the wheels and the U-frame straddles a row of plants, and is pushed forward by the operator. As the shovel-bearing members are brought adjacent a plant, the operator swings the grip portions of the hand levers toward each other, as illustrated in Fig. 3, thereby moving the shovel-bearing members laterally away from each other so as to engage and stir up the earth at each side of the plant. As the machine passes a given plant, the operator moves his hands apart, thereby swinging the hand levers to bring the shovel-bearing members toward each other so that the shovels engage and stir up the earth between adjacent plants in the row. This operation may be repeated as the machine passes over each plant so that the earth is turned up and cultivated completely around every plant. Obviously, if it is found necessary to swing but one of the shovel-bearing members laterally, the lever which controls that member alone is moved, while the other is held stationary, but in nearly all cases, it will be found feasible and expedient to move both of the hand levers toward and from each other.

It will be particularly noted that the construction of the hand levers as levers of the first class, with the fulcrum between the power and work ends thereof admits of a wide range of adjusting movement of the shovels or tools with certainty and facility and with a minimum of effort on the part of the operator, and enables the apparatus to be employed to thoroughly agitate and break up the ground all about individual plants not only between the rows of plants, but between adjacent plants in a single row, without danger of injuring any of the plants.

What I claim is:—

1. A cultivator comprising a wheeled frame adapted to straddle the plant rows, laterally adjustable shovel-bearing members connected to each side of said frame, and levers connected at their lower ends to said members and fulcrumed intermediate their ends to said frame, whereby movement of the levers toward and from each other moves the shovel-bearing members from and toward each other respectively to permit the shovels to cultivate between adjacent rows and between plants in the same row.

2. A cultivator comprising a wheeled frame adapted to straddle the plant rows, laterally adjustable shovel-bearing members connected to each side of said frame, levers connected at their lower ends to said members and fulcrumed intermediate their ends to said frame, a cross bar pivoted to said levers intermediate their length and rods connecting said bar and the said frame, whereby movement of the levers toward and from each other moves the shovel-bearing members from and toward each other, respectively, to permit the shovels to cultivate between adjacent rows and between plants in the same row.

3. A cultivator comprising a wheeled rigid arch frame adapted to straddle the plant rows, laterally adjustable shovel-bearing members connected to each side of said frame, and levers connected at their lower ends to said members and fulcrumed intermediate their ends to said frame, whereby the shovel-bearing members may be moved toward and from each other to permit the shovels to cultivate between adjacent rows and between plants in the same row.

4. A cultivator comprising a wheeled rigid arch frame adapted to straddle the plant rows, laterally adjustable shovel-bearing members connected to each side of said frame, levers connected at their lower ends to said members and fulcrumed intermediate their ends to said frame, a cross bar pivoted to said levers intermediate their length and rods connecting said bar and the said frame, whereby the shovel-bearing members may be moved toward and from each other to permit the shovels to cultivate between adjacent rows and between plants in the same row.

5. A cultivator comprising a wheeled frame adapted to straddle the plant rows, laterally adjustable parallel shovel-bearing bars pivoted to each side of said frame, and levers connected at their lower ends to said bars and fulcrumed intermediate their ends to said frame, whereby the shovel-bearing bars may be moved toward and from each other to permit the shovels to cultivate between adjacent rows and between plants in the same row.

In testimony whereof I affix my signature.

FREDERICK J. PRITCHARD.